US012782842B2

(12) United States Patent
Yoshida et al.

(10) Patent No.: US 12,782,842 B2
(45) Date of Patent: Nov. 3, 2026

(54) OPTICAL SCANNING DEVICE AND IMAGE FORMING APPARATUS INCLUDING THE SAME

(71) Applicant: KYOCERA Document Solutions Inc., Osaka (JP)

(72) Inventors: Shingo Yoshida, Osaka (JP); Kenichiro Kawasaki, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 5 days.

(21) Appl. No.: 19/101,526

(22) PCT Filed: Aug. 8, 2023

(86) PCT No.: PCT/JP2023/028874
§ 371 (c)(1),
(2) Date: Feb. 5, 2025

(87) PCT Pub. No.: WO2024/034595
PCT Pub. Date: Feb. 15, 2024

(65) Prior Publication Data

US 2026/0147289 A1 May 28, 2026

(30) Foreign Application Priority Data

Aug. 8, 2022 (JP) ................................ 2022-126455

(51) Int. Cl.
*G03G 15/043* (2006.01)
*G03G 15/04* (2006.01)

(52) U.S. Cl.
CPC ..... *G03G 15/043* (2013.01); *G03G 15/04072* (2013.01); *G03G 2215/0404* (2013.01); *G03G 2221/1636* (2013.01)

(58) Field of Classification Search
CPC ....... G03G 15/04054; G03G 15/04063; G03G 15/04072; G03G 15/043;
(Continued)

(56) References Cited

U.S. PATENT DOCUMENTS

2016/0033890 A1 2/2016 Sumikura et al. ..... G03G 15/04
2016/0033923 A1 * 2/2016 Sumikura .......... G03G 21/0005 399/98
(Continued)

FOREIGN PATENT DOCUMENTS

JP 2016-031467 A 3/2016
JP 2019-200356 A 11/2019
JP 2019-200357 A 11/2019

OTHER PUBLICATIONS

Machine Translation of JP 2019-200357. (Year: 2019).*
International Search Report mailed Oct. 3, 2023, issued to corresponding International Application No. PCT/JP2023/028874.

*Primary Examiner* — Carla J Therrien
(74) *Attorney, Agent, or Firm* — Stein IP, LLC

(57) ABSTRACT

An optical scanning device (12) includes a casing (**12*a*), a transmissive member (52), a linear member (54), a drive portion (55), guide rails (61), a pair of cleaning holders (511), a cleaning member (53), a detecting portion (56), and a control section (90). The control section (90) controls driving of the drive portion (55). The control section (90) performs control so that, during execution of a cleaning mode, upon detection by the detecting portion (56) that one of the pair of cleaning holders (511) has reached one end of a movement path of the one of the pair of cleaning holders (511), an outward operation is started, and upon detection by the detecting portion (56) that the other of the pair of cleaning holders (511) has reached one end of a movement path of the other of the pair of cleaning holders (511**), a homeward operation is started.

11 Claims, 11 Drawing Sheets

(58) Field of Classification Search
CPC .... G03G 2215/0404–0414; G03G 2221/1636; G02B 27/0006; B41J 2/44–46
See application file for complete search history.

(56) References Cited

U.S. PATENT DOCUMENTS

| | | | | |
|---|---|---|---|---|
| 2017/0329275 | A1* | 11/2017 | Uchida | G03G 21/0035 |
| 2020/0174417 | A1* | 6/2020 | Imai | G03G 15/011 |
| 2021/0011393 | A1* | 1/2021 | Yoshida | G03B 21/58 |
| 2021/0382408 | A1* | 12/2021 | Yoshida | G03G 15/0409 |
| 2021/0382409 | A1* | 12/2021 | Yoshida | G03G 15/0409 |
| 2024/0045354 | A1* | 2/2024 | Kawasaki | G03G 15/04072 |
| 2025/0224687 | A1* | 7/2025 | Yoshida | G03G 15/04072 |
| 2025/0390036 | A1* | 12/2025 | Yoshida | G03G 15/0435 |

* cited by examiner

OPTICAL SCANNING DEVICE AND IMAGE FORMING APPARATUS INCLUDING THE SAME

CROSS-REFERENCE TO RELATED APPLICATIONS

This application is a national stage of International Application No. PCT/JP2023/028874, filed Aug. 8, 2023, which claims the benefit of Japanese Application No. 2022-126455, filed Aug. 8, 2022, in the Japanese Patent Office, the disclosures of which are incorporated herein by reference.

TECHNICAL FIELD

The present invention relates to an optical scanning device that irradiates an image carrier with light so as to form an electrostatic latent image thereon in an image forming apparatus employing an electrophotographic method, and to the image forming apparatus including the optical scanning device.

BACKGROUND ART

There have conventionally been disclosed optical scanning devices (see, for example, Patent Document 1). Such an optical scanning device irradiates a charged image carrier with light so as to form an electrostatic latent image on the image carrier. The optical scanning device includes a casing, a transmissive member, a linear member, a drive member, guide rails, a cleaning holder, a cleaning member, and a stopper.

The casing has laser light emission ports formed therein to extend in a main scanning direction of laser light with which the image carrier is to be irradiated. The transmissive member extends in the main scanning direction of the laser light and seals each of the laser light emission ports. A spiral member extends in an extending direction of the transmissive member. The guide rails are provided side by side with the emission ports and extend in the extending direction of the transmissive member.

The cleaning holder is connected to the linear member, and two such cleaning holders move along the transmissive member as the linear member travels circularly. The cleaning member is secured to each of the cleaning holders and, as the cleaning holders move, slides against the transmissive member, thus cleaning the transmissive member. When one of the cleaning holders abuts on the stopper at one end of a movement path thereof, the linear member is stopped from traveling.

CITATION LIST

Patent Literature

Patent Document 1: Japanese Unexamined Patent Application Publication No. 2016-31467

SUMMARY OF INVENTION

Technical Problem

In the conventional optical scanning device, when switched from an outward operation to a homeward operation, the cleaning holders are stopped from movement in a state where one of them abuts on the stopper. It has been problematic that, at this time, a large tension (load) is applied to the linear member, causing damage to a gear supporting the linear member so that the linear member can travel circularly.

In view of the above-described problem, it is an object of the present invention to provide an optical scanning device capable of reducing a load applied to a linear member and an image forming apparatus including the same.

Solution to Problem

In order to achieve the above-described object, a first configuration of the present invention provides an optical scanning device that irradiates an image carrier with laser light so as to form an electrostatic latent image thereon and includes a casing, a transmissive member, a linear member, a drive portion, guide rails, a pair of cleaning holders, a cleaning member, a detecting portion, and a control section. The casing has a plurality of emission ports for emitting the laser light formed therein to extend in a main scanning direction of the laser light so as to each correspond to the image carrier. The transmissive member is transmissive to the laser light, extends in the main scanning direction of the laser light, and seals each of the plurality of emission ports for emitting the laser light. The linear member is stretched circularly on the casing. The drive portion drives the linear member to travel in a first direction and in a second direction. The guide rails are provided side by side with the plurality of emission ports and extend in an extending direction of the transmissive member. The pair of cleaning holders is secured to the linear member and, when the linear member is driven to travel circularly by the drive portion, moves on the transmissive members adjacent to each other along the guide rails in mutually opposite directions. The cleaning member is secured to each of the pair of cleaning holders and, as the pair of cleaning holders moves, slides against the transmissive member, thus cleaning the transmissive member. The detecting portion is arranged at one side in the extending direction of the transmissive member and detects that the pair of cleaning holders have reached one ends of movement paths of the pair of cleaning holders. The control section controls driving of the drive portion. The control section is capable of executing a cleaning mode including an outward operation and a homeward operation. In the outward operation, the linear member is driven to travel in the first direction so that the pair of cleaning holders moves along the extending direction of the transmissive member. In the homeward operation, after execution of the outward operation, the linear member is driven to travel in the second direction so that the pair of cleaning holders moves in directions reverse to those in the outward operation. During execution of the cleaning mode, upon detection by the detecting portion that one of the pair of cleaning holders has reached the one end of the movement path of the one of the pair of cleaning holders, the outward operation is started, and upon detection by the detecting portion that the other of the pair of cleaning holders has reached the one end of the movement path of the other of the pair of cleaning holders, the homeward operation is started.

Advantageous Effects of Invention

According to the first configuration of the present invention, it is possible to reduce a load applied to a linear member.

DESCRIPTION OF EMBODIMENTS

Figure 1:
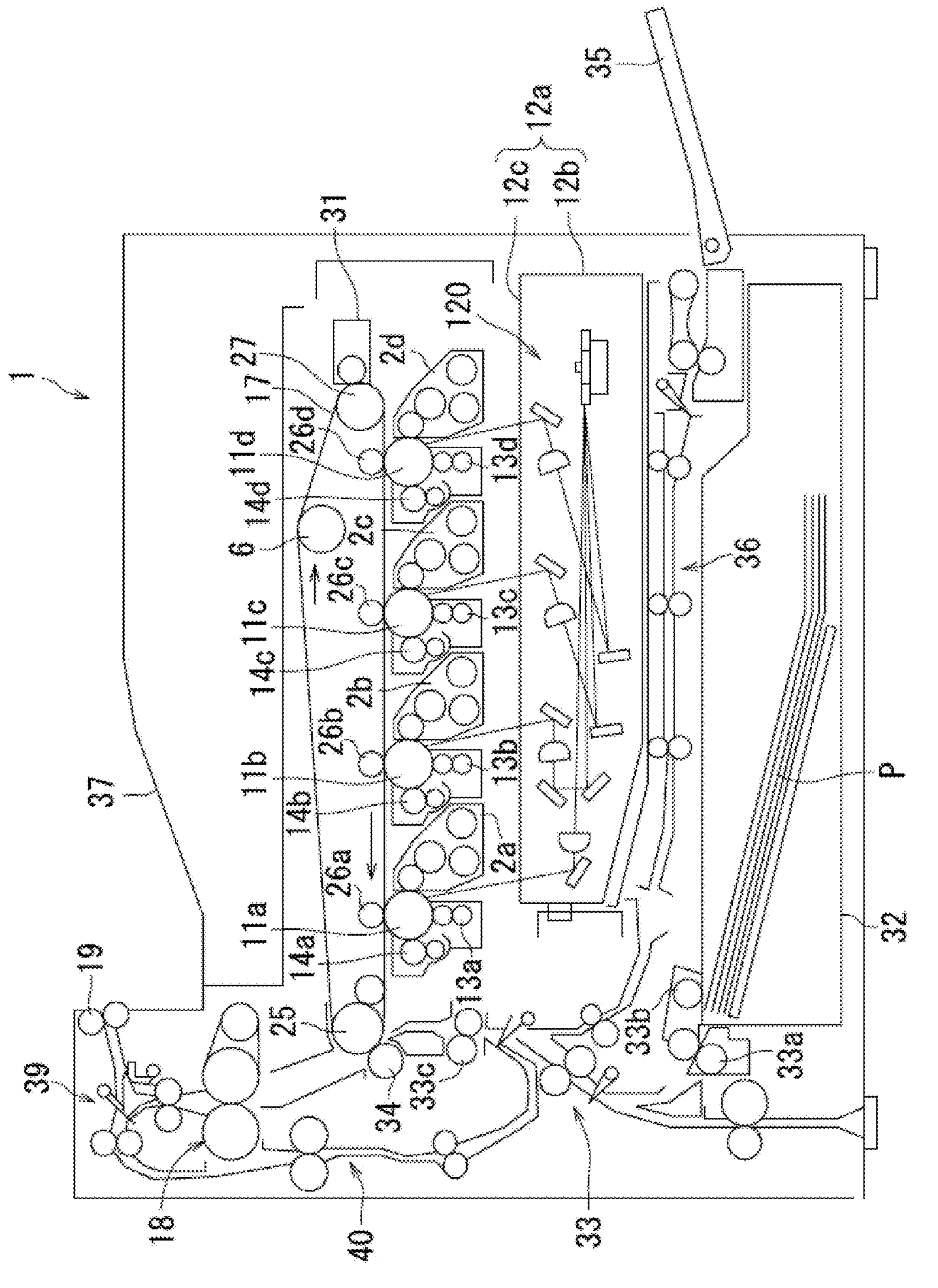
FIG. 1 A sectional view schematically showing an overall configuration of an image forming apparatus 1 in which an optical scanning device 12 of the present invention is mounted.

With reference to the appended drawings, the following describes an embodiment of the present invention. FIG. 1 is a sectional view schematically showing an overall configuration of an image forming apparatus 1 in which an optical scanning device of the present invention is mounted. The image forming apparatus 1 is a tandem-type color printer. The image forming apparatus 1 includes rotatable photosensitive drums 11*a* to 11*d* as image carriers. The photosensitive drums 11*a* to 11*d* are each formed of an organic photosensitive member (an OPC photosensitive member) including an organic photosensitive layer formed thereon, an amorphous silicon photosensitive member including an amorphous silicon photosensitive layer formed thereon, or the like. The photosensitive drums 11*a* to 11*d* are arranged in a tandem manner so as to correspond to respective colors of magenta, cyan, yellow, and black.

A developing device 2*a*, a charger 13*a*, and a cleaning device 14*a* are provided around the photosensitive drum 11*a*. Similarly thereto, developing devices 2*b* to 2*d*, chargers 13*b* to 13*d*, and cleaning devices 14*b* to 14*d* are provided around the photosensitive drums 11*b* to 11*d*, respectively. Furthermore, an optical scanning device 12 is provided below the developing devices 2*a* to 2*d*.

The developing devices 2*a* to 2*d* are each arranged on a right side of a corresponding one of the photosensitive drums 11*a* to 11*d*. The developing devices 2*a* to 2*d* are opposed to the photosensitive drums 11*a* to 11*d* and supply toner thereto, respectively. In the present description, terms "right" and "left" refer to the right and the left in the drawings, respectively.

The chargers 13*a* to 13*d* are arranged upstream of the developing devices 2*a* to 2*d* in a rotation direction of the photosensitive drums 11*a* to 11*d* so as to be opposed to surfaces of the photosensitive drums 11*a* to 11*d*, respectively. The chargers 13*a* to 13*d* uniformly charge the surfaces of the photosensitive drums 11*a* to 11*d*, respectively.

Based on image data such as characters and patterns inputted from a personal computer or the like to an image input portion, the optical scanning device 12 irradiates with light (optically scans) the surfaces of the photosensitive drums 11*a* to 11*d*, which have been uniformly charged by the chargers 13*a* to 13*d*, respectively, so as to form electrostatic latent images on the surfaces of the photosensitive drums 11*a* to 11*d*.

A casing 12*a* of the optical scanning device 12 includes a housing portion 12*b* having an opening in one surface thereof and a cover portion 12*c* covering the opening. The housing portion 12*b* incorporates therein a scanning optical system 120. In the cover portion 12*c*, emission ports 12*d* (see FIG. 5) for emitting light (laser light) emitted from the scanning optical system 120 are formed so as to correspond to the photosensitive drums 11*a* to 11*d*. Moreover, as will be described later, the emission ports 12*d* are each covered with a transmissive member 52. The transmissive member 52 is transmissive to light emitted from the scanning optical system 120.

The scanning optical system 120 includes a laser light source (not shown) and a polygon mirror. The scanning optical system 120 also includes at least one reflection mirror and a lens so as to correspond to each of the photosensitive drums 11*a* to 11*d*. Laser light emitted from the laser light source is irradiated via the polygon mirror, the reflection mirrors, and the lenses to the surfaces of the photosensitive drums 11*a* to 11*d*, respectively, from downstream of the chargers 13*a* to 13*d* in the rotation direction of the photosensitive drums 11*a* to 11*d*. Thus, electrostatic latent images are formed on the surfaces of the photosensitive drums 11*a* to 11*d*. These electrostatic latent images are developed into toner images by the developing devices 2*a* to 2*d*.

An endless intermediate transfer belt 17 is stretched over a tension roller 6, a driving roller 25, and a driven roller 27. The driving roller 25 is rotated by a motor (not shown), and thus the intermediate transfer belt 17 is driven to circulate in a clockwise direction in FIG. 1.

Below the intermediate transfer belt 17, the photosensitive drums 11*a* to 11*d* are arrayed adjacently to each other along a conveyance direction (an arrow direction in FIG. 1). Furthermore, the photosensitive drums 11*a* to 11*d* are in contact with the intermediate transfer belt 17. Primary transfer rollers 26*a* to 26*d* are opposed to the photosensitive drums 11*a* to 11*d* via the intermediate transfer belt 17, respectively. The primary transfer rollers 26*a* to 26*d* are brought into pressure contact with the intermediate transfer belt 17 so as to form, together with the photosensitive drums 11*a* to 11*d*, primary transfer portions. In these primary transfer portions, the toner images are transferred to the intermediate transfer belt 17. To be more specific, a primary transfer voltage is applied to the primary transfer rollers 26*a* to 26*d*, and thus the toner images on the photosensitive drums 11*a* to 11*d* are sequentially transferred to the intermediate transfer belt 17 at prescribed timing. Thus, on a surface of the intermediate transfer belt 17, a full-color toner image is formed in which the toner images of the four different colors of magenta, cyan, yellow, and black are overlaid on each other to be in a prescribed positional relationship.

A secondary transfer roller 34 is opposed to the driving roller 25 via the intermediate transfer belt 17. The secondary transfer roller 34 is brought into pressure contact with the intermediate transfer belt 17 so as to form, together with the driving roller 25, a secondary transfer portion. In the secondary transfer portion, a secondary transfer voltage is applied to the secondary transfer roller 34, and thus the toner image on the surface of the intermediate transfer belt 17 is transferred to a sheet P. After the toner image has been transferred, a belt cleaning device 31 cleans residual toner remaining on the intermediate transfer belt 17.

A paper feed cassette 32 is provided on a lower side in the image forming apparatus 1. The paper feed cassette 32 is capable of containing therein a plurality of sheets P. A stack tray 35 for manual paper feeding is provided on a right side of the paper feed cassette 32. A first sheet conveyance path 33 is provided on a left side of the paper feed cassette 32. The first sheet conveyance path 33 conveys the sheet P fed out from the paper feed cassette 32 to the secondary transfer portion. Furthermore, a second sheet conveyance path 36 is provided on a left side of the stack tray 35. The second sheet conveyance path 36 conveys a sheet fed out from the stack tray 35 to the secondary transfer portion. Moreover, a fixing portion 18 and a third sheet conveyance path 39 are provided on an upper left side in the image forming apparatus 1. The fixing portion 18 performs a fixing process with respect to the sheet P on which an image has been formed. The third sheet conveyance path 39 conveys the sheet P that has been subjected to the fixing process to a sheet discharge portion 37.

The sheet P contained in the paper feed cassette 32 is fed out one by one by a pick-up roller 33*b* and a separating roller pair 33*a* toward the first sheet conveyance path 33.

The first sheet conveyance path 33 and the second sheet conveyance path 36 merge together before reaching a registration roller pair 33*c* (upstream thereof). The registration roller pair 33*c* conveys the sheet P to the secondary transfer portion so that an image forming operation on the intermediate transfer belt 17 is timed with an operation of paper feeding to the secondary transfer portion. By the secondary transfer roller 34 to which the secondary transfer voltage has been applied, the full-color toner image on the intermediate transfer belt 17 is secondarily transferred to the sheet P conveyed to the secondary transfer portion. The sheet P to which the full-color toner image has been transferred is conveyed to the fixing portion 18.

The fixing portion 18 includes a fixing belt that is heated by a heater, a fixing roller that is internally in contact with the fixing belt, a pressing roller that is brought into pressure contact with the fixing roller via the fixing belt, and so on. The fixing portion 18 applies heat and pressure to the sheet P to which the toner image has been transferred. Thus, the fixing process is implemented. Where necessary, the sheet P to which the toner image has been fixed in the fixing portion 18 is turned upside down by passing through a fourth sheet conveyance path 40. After that, the sheet P is conveyed again to the secondary transfer portion via the registration roller pair 33*c*, and then a new toner image is secondarily transferred to a back side of the sheet P by the secondary transfer roller 34 and is fixed thereto in the fixing portion 18. The sheet P to which the toner image has been fixed passes through the third sheet conveyance path 39 to be discharged by a discharge roller pair 19 to the sheet discharge portion 37.

Figure 2:
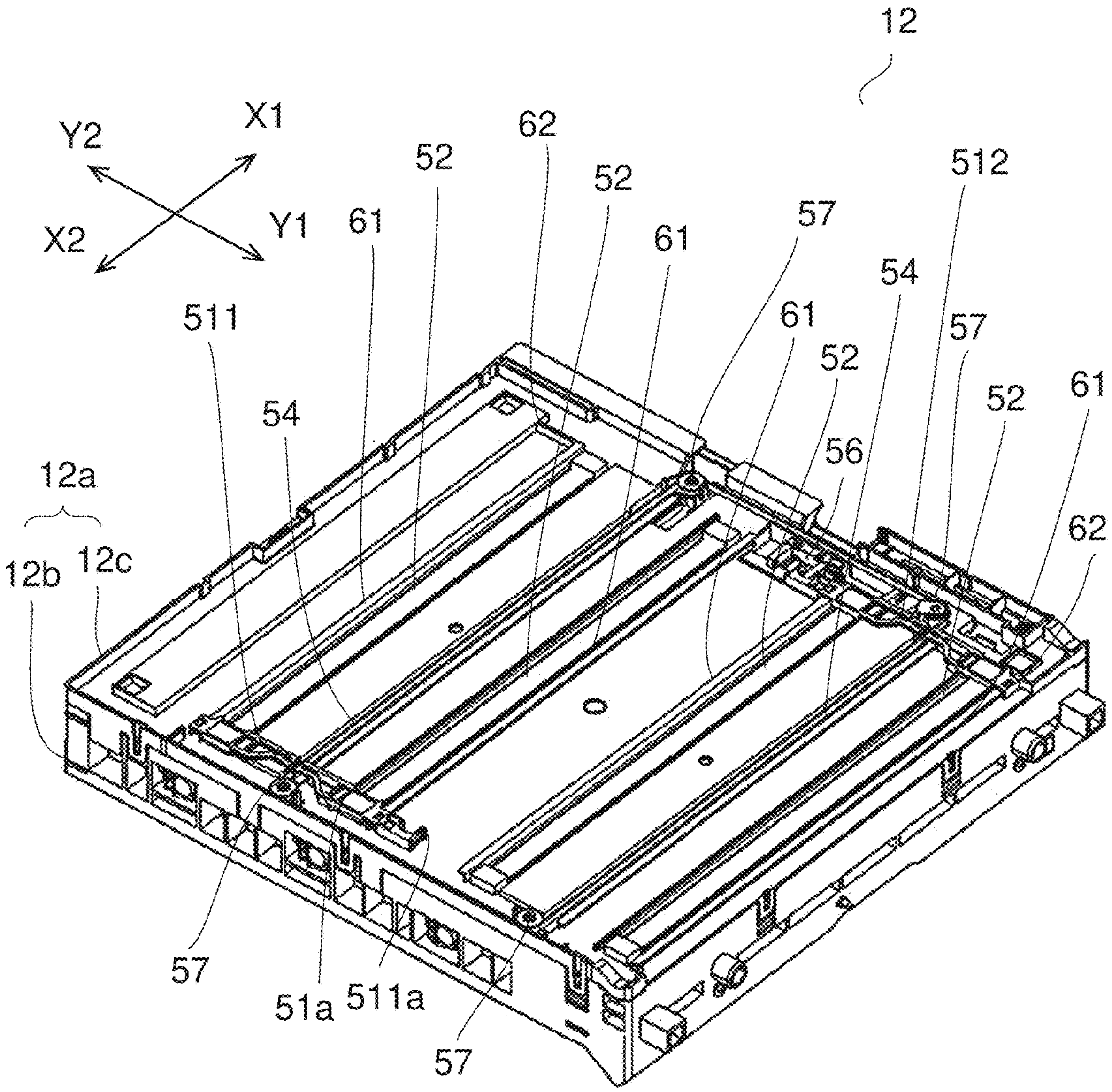
FIG. 2 A perspective view of the optical scanning device 12 according to an embodiment of the present invention.
Figure 3:
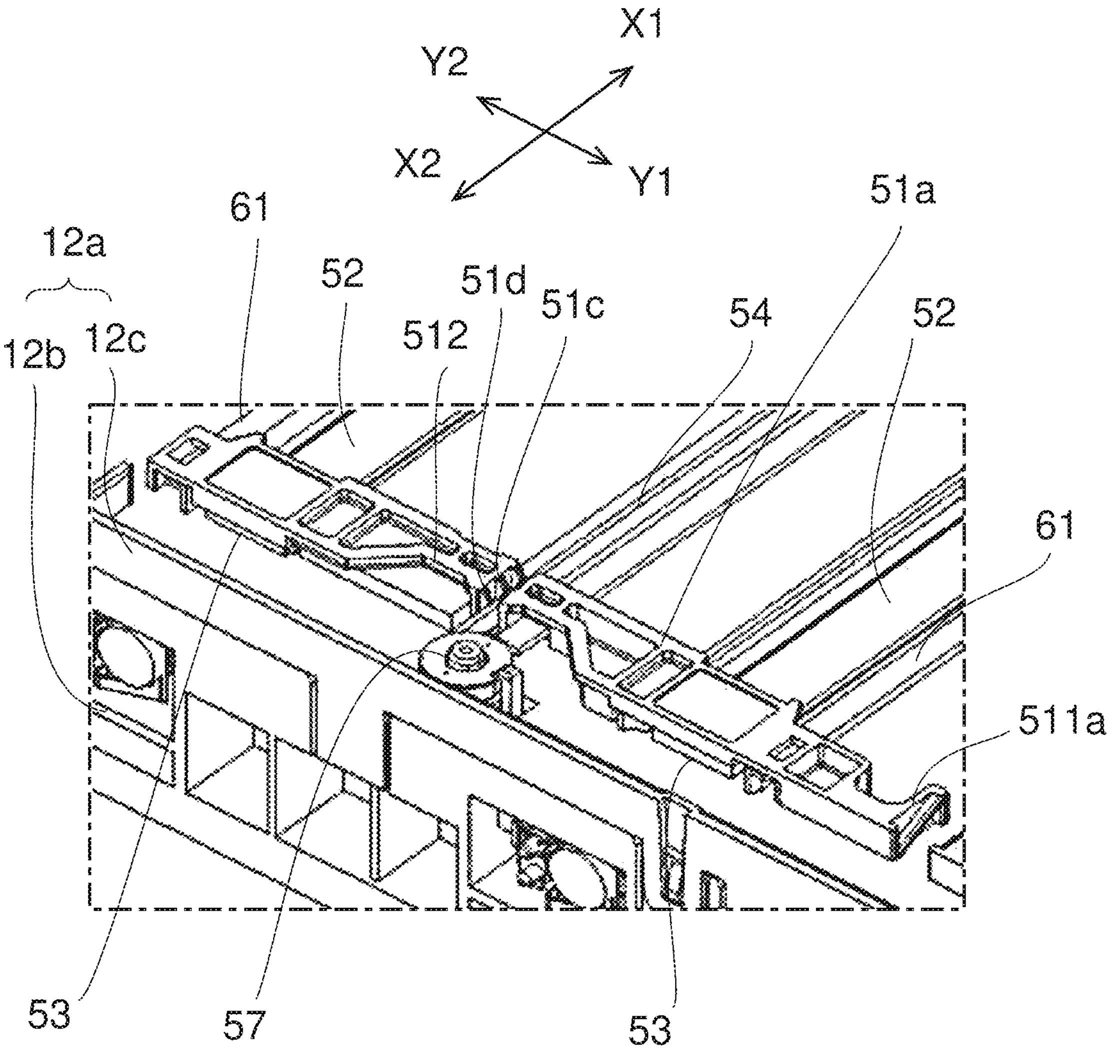
FIG. 3 An enlarged perspective view showing a part of the optical scanning device 12 according to the embodiment of the present invention.
Figure 4:
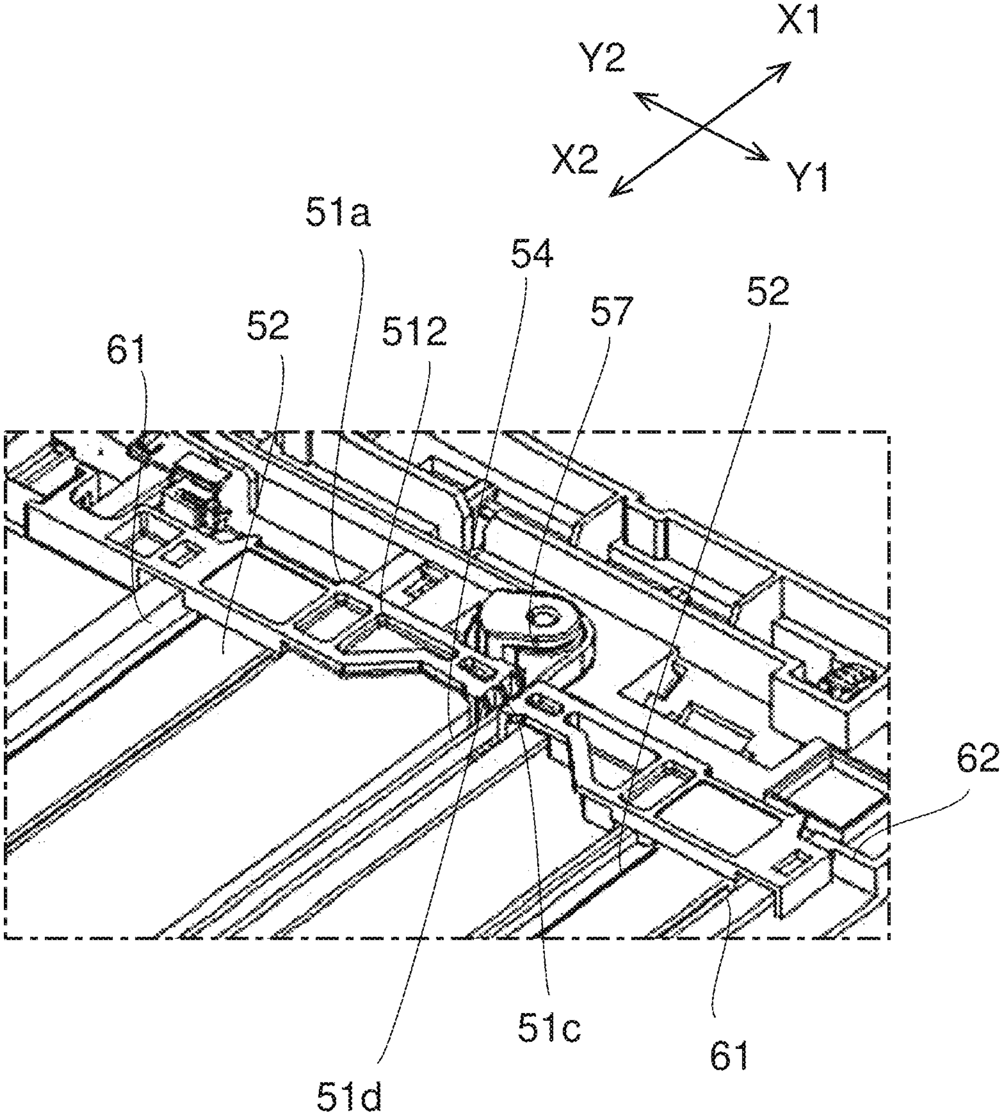
FIG. 4 An enlarged perspective view showing a part of the optical scanning device 12 according to the embodiment of the present invention.
Figure 5:
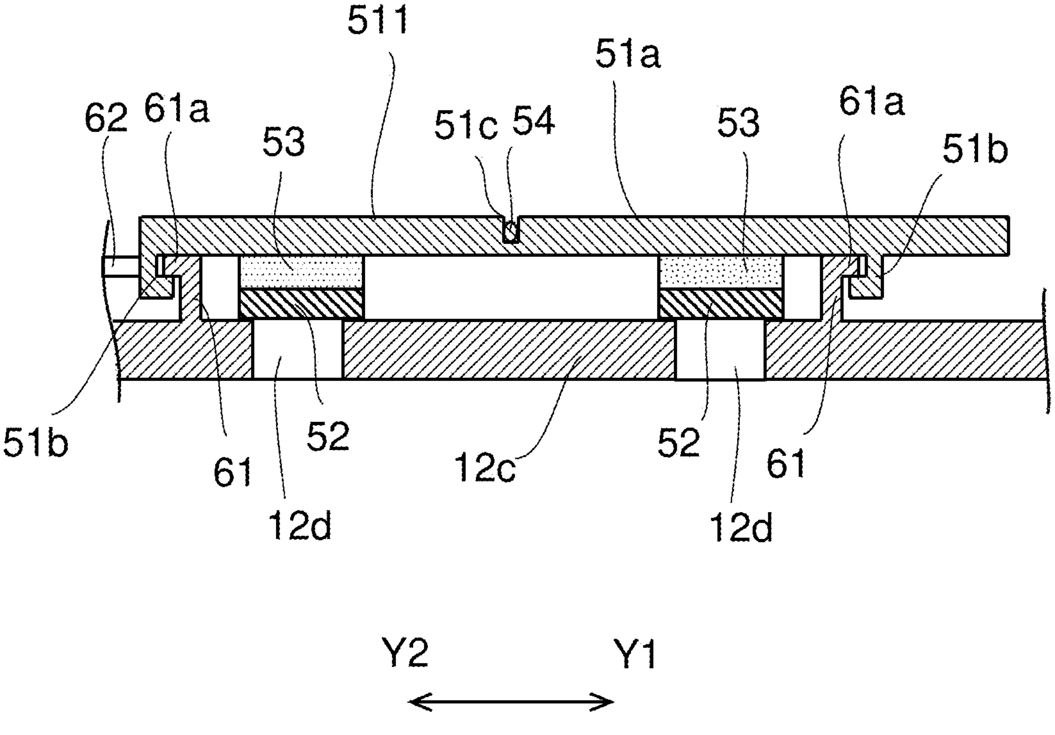
FIG. 5 A sectional view schematically showing a part of the optical scanning device 12 according to the embodiment of the present invention as seen from a movement direction of a cleaning holder 511.
Figure 6:
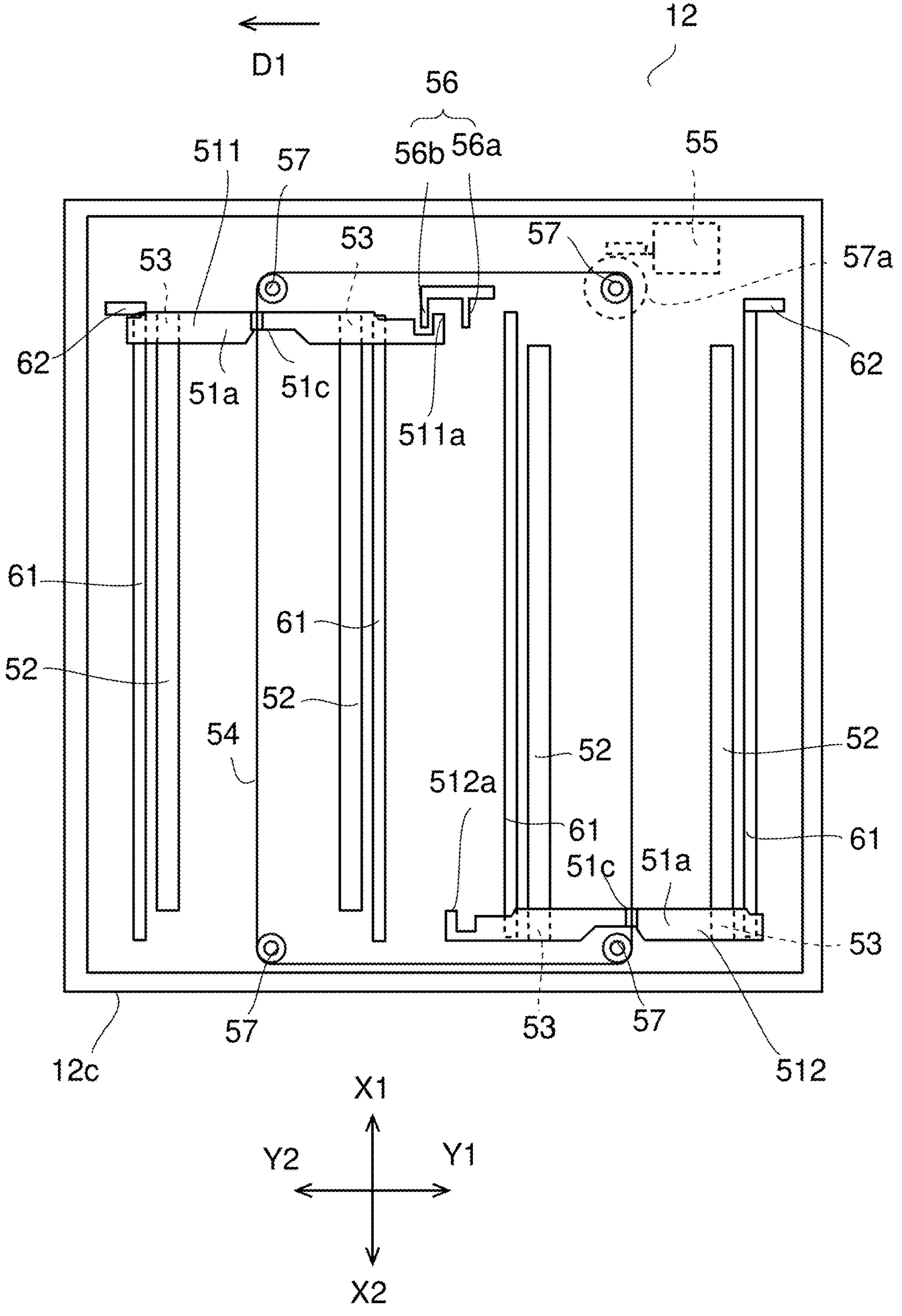
FIG. 6 A plan view schematically showing the optical scanning device 12 according to the embodiment of the present invention.
Figure 7:
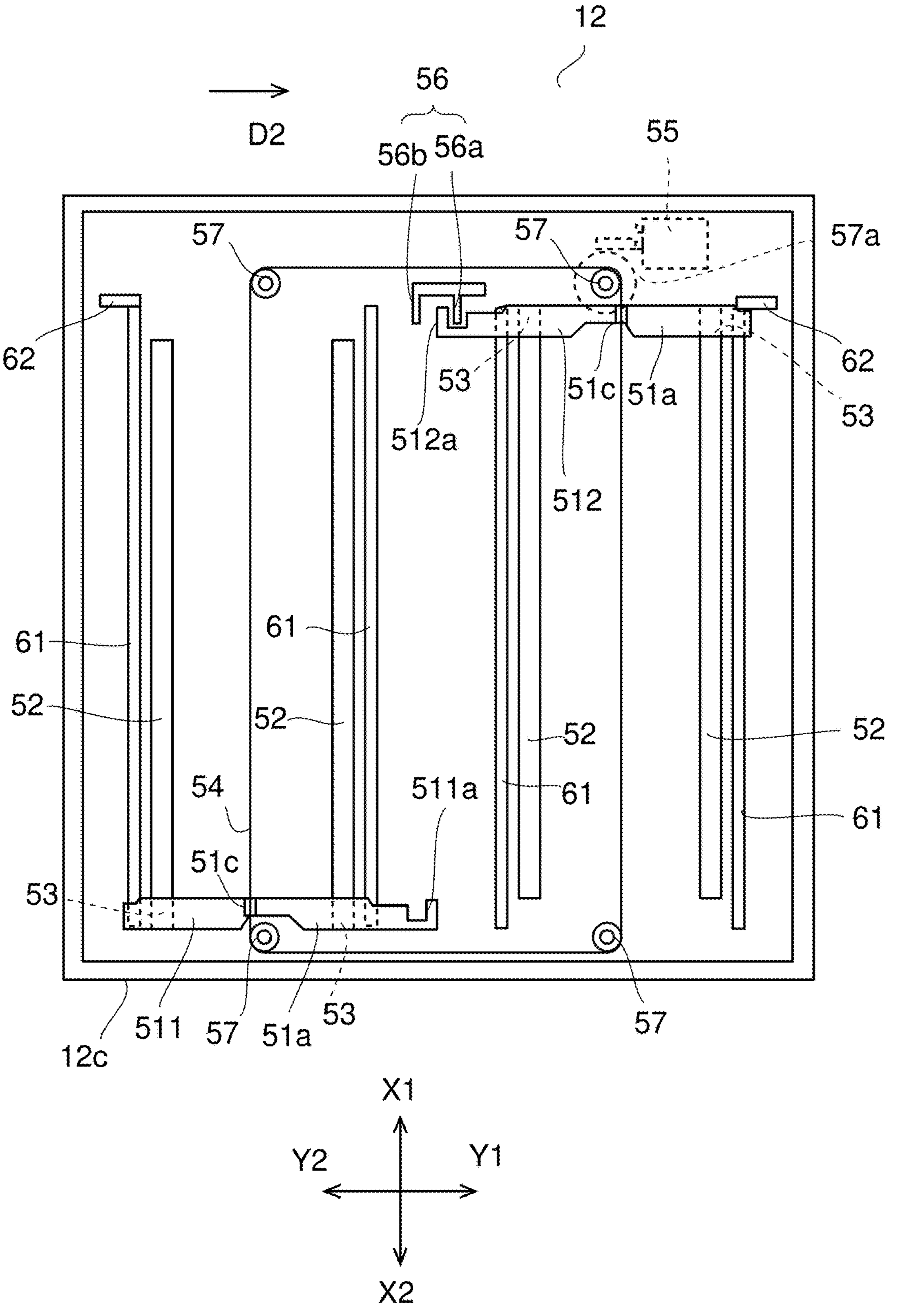
FIG. 7 A plan view schematically showing the optical scanning device 12 according to the embodiment of the present invention.

Next, with reference to FIG. 2 to FIG. 6, a description is given of the optical scanning device 12. FIG. 2 is a perspective view of the optical scanning device 12. FIG. 3 and FIG. 4 are each an enlarged perspective view showing a part of the optical scanning device 12. FIG. 5 is a sectional view schematically showing a part of the optical scanning device 12 as seen from a movement direction of a cleaning holder 511. FIG. 6 and FIG. 7 are each a plan view schematically showing the optical scanning device 12.

In the drawings referred to below, an extending direction of the transmissive member 52 is shown as an X direction, where X1 indicates one side in the extending direction of the transmissive member 52 toward a detecting portion 56 and X2 indicates the other side in the extending direction of the transmissive member 52 away from the detecting portion 56. A juxtaposition direction of the transmissive member 52 is shown as a Y direction, where Y1 indicates one side in the juxtaposition direction of the transmissive member 52 and Y2 indicates the other side in the juxtaposition direction of the transmissive member 52. Furthermore, in FIG. 2, shapes of various parts and positional relationships therebetween are described on an assumption that cleaning holders 511 and 512 are located above the cover portion 12*c*. An up-down direction is referred to merely for the sake of explanation without limiting a direction in which the optical scanning device 12 is incorporated in the image forming apparatus 1.

Figure 10:
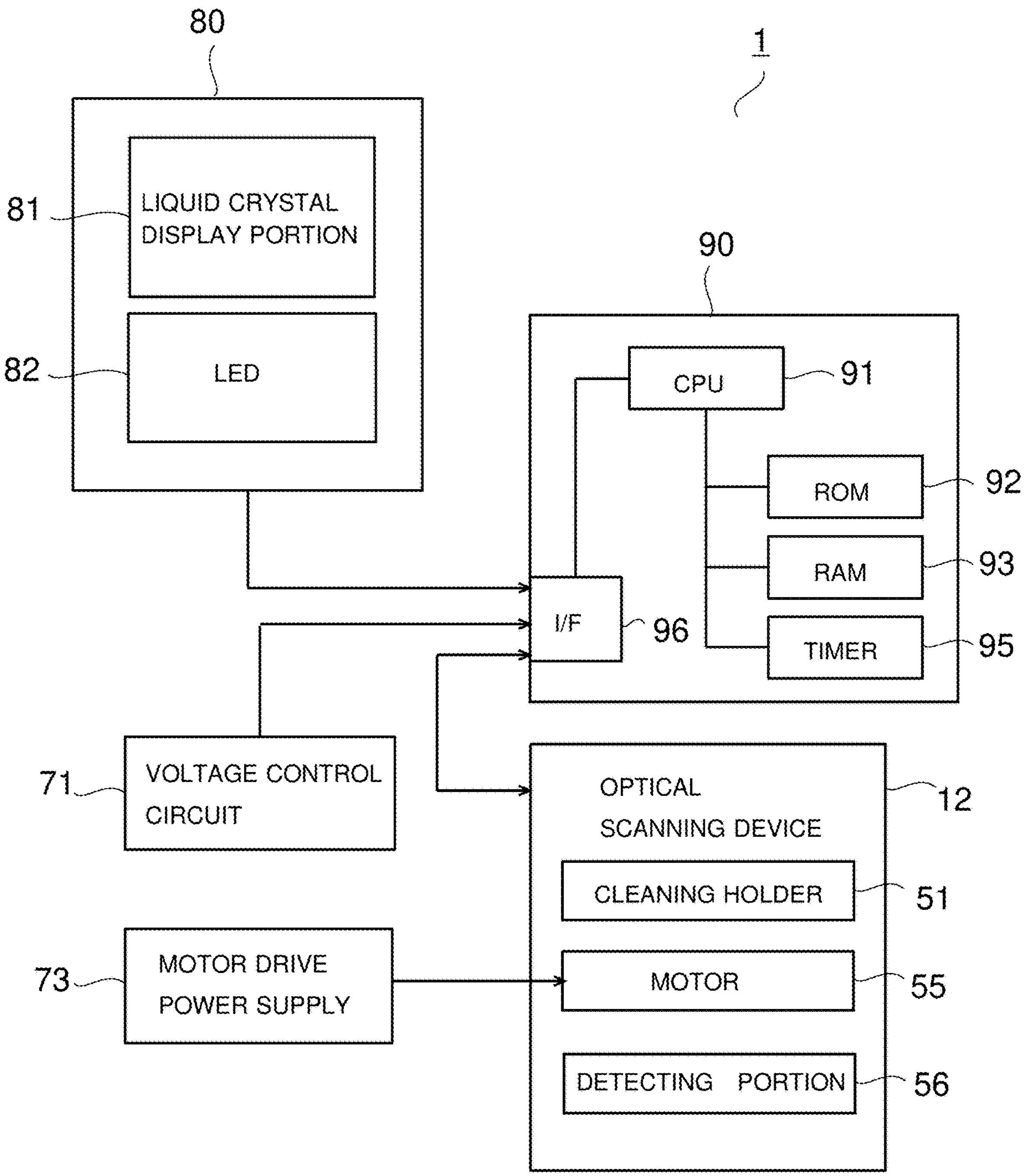
FIG. 10 A block diagram showing an example of control paths used in the image forming apparatus 1 according to the embodiment of the present invention.

The optical scanning device 12 includes the casing 12*a*, the transmissive member 52, a linear member 54, a motor (a drive portion) 55, guide rails 61, a stopper 62, the cleaning holders 511 and 512, a cleaning member 53, the detecting portion 56, and a control section 90 (see FIG. 10).

The casing 12*a* includes the housing portion 12*b* and the cover portion 12*c* fitted to the housing portion 12*b*, and the cover portion 12*c* has four laser light emission ports 12*d* (see FIG. 5) provided side by side so as to correspond to the four photosensitive drums 11*a* to 11*d*. The emission ports 12*d* each have a rectangular shape elongated in a main scanning direction of corresponding laser light (the X direction) and are formed so that longitudinal directions thereof (in the X direction) are parallel to each other.

The transmissive member 52 is formed in a rectangular plate shape and seals each of the emission ports 12*d*. Thus, it is possible to prevent entry of toner, dust, or the like into the optical scanning device 12 via the emission ports 12*d*. Four transmissive members 52 are provided side by side so that longitudinal directions thereof (in the X direction) are parallel to each other. The transmissive members 52 are formed of, for example, a glass cover.

A pair of guide rails 61 is arranged on each of both sides so as to interpose therebetween a pair of transmissive members 52. That is, four guide rails 61 are provided side by side. The guide rails 61 protrude from an upper surface of the cover portion 12*c* and extend in the extending direction of the transmissive members 52 (the X direction). Each of the guide rails 61 includes a guide rib 61*a* (see FIG. 5) that protrudes outward from a distal end thereof and extends in the extending direction of the transmissive members 52 (the X direction).

The stopper 62 is arranged at one side (the X1 side) of the guide rails 61 in an extending direction thereof and restricts movement of the cleaning holders 511 and 512 toward the one side (the X1 side) in the extending direction. The stopper 62 is secured to the upper surface of the cover portion 12*c*. In this embodiment, the stopper 62 is provided at one of every adjacent two of the guide rails 61 that are straddled by a corresponding one of the cleaning holders 511 and 512 and extends in the juxtaposition direction of the transmissive members 52 (the Y direction).

The cleaning holders 511 and 512 are arranged on the upper surface (a surface nearer to the photosensitive drums 11*a* to 11*d*) of the cover portion 12*c* and each include a main body 51*a*, an engagement portion 51*b*, and a corresponding one of light-blocking portions 511*a* and 512*a*. The main body 51*a* is formed in a plate shape and extends in the juxtaposition direction of the transmissive members 52 (the Y direction) so as to straddle corresponding adjacent two of the transmissive members 52.

The cleaning member 53 is secured to a lower surface of the main body 51*a* (see FIG. 5). A pair of cleaning members 53 is arranged inward of the engagement portion 51*b* in the juxtaposition direction (the Y direction). As the linear member 54 travels circularly, the cleaning members 53 slide on upper surfaces (surfaces nearer to the photosensitive drums 11*a* to 11*d*) of the transmissive members 52. Thus, the upper surfaces of the transmissive members 52 are cleaned at once by the cleaning members 53 corresponding thereto.

The cleaning members 53 are formed of, for example, a rubber pad. As a material of the rubber pad, for example, silicone rubber can be used. The cleaning holders 511 and 512 are made of, for example, resin. Without being limited to the rubber pad, the cleaning members 53 may be formed of, for example, a nonwoven fabric.

A pair of engagement portions 51*b* is arranged so as to interpose therebetween and on both sides of each pair of guide rails 61. Each of the engagement portions 51*b* protrudes downward from a bottom surface of the main body 51*a* and is bent at a distal end thereof toward one of the guide rails 61 adjacent thereto. The engagement portions 51*b* engage with the guide ribs 61*a*. The cleaning holders 511 and 512 are each guided along a corresponding pair of guide rails 61. This enables stable movement of the cleaning holders 511 and 512 on the transmissive members 52 along the extending direction (the X direction).

Furthermore, the engagement portions 51*b* and the guide ribs 61*a* engage with each other, and thus the main body 51*a* is latched at both ends thereof to corresponding ones of the guide rails 61 in a direction away from the casing 12*a* of the optical scanning device 12 (an upward direction in FIG. 5). This restricts upward movement (positional shift) of the cleaning holders 511 and 512 and thus can prevent disengagement of the cleaning holders 511 and 512 from the cover portion 12*c*. Accordingly, the cleaning members 53 can be stably kept in tight contact with the transmissive members 52.

Furthermore, in the extending direction of the guide rails 61 (the X direction), the guide rails 61 are open on the other side (the X2 side) in the extending direction thereof (see FIG. 6 and FIG. 7). Thus, by sliding the cleaning holders 511 and 512 from the other end of the guide rails 61 in the extending direction thereof to the one side (the X1 side) of the guide rails 61 in the extending direction thereof while the engagement portions 51*b* are engaged with the guide ribs 61*a*, the cleaning holders 511 and 512 can be easily mounted onto the guide rails 61. Accordingly, workability in assembling the optical scanning device 12 can be improved.

While the engagement portions 51*b* and the guide ribs 61*a* are exemplarily used for engagement between the cleaning holders 511 and 512 and the cover portion 12*c*, the present invention is not limited to this structure.

In the cleaning holder 511, the light-blocking portion 511*a* is arranged at a lateral end of the main body 51*a* on the one side (the Y1 side) in the juxtaposition direction and protrudes toward the one side (an X1 direction) in the extending direction (see FIG. 6 and FIG. 7). In the cleaning holder 512, the light-blocking portion 512*a* is arranged at a lateral end of the main body 51*a* on the other side (the Y2 side) in the juxtaposition direction and protrudes toward the one side (the X1 direction) in the extending direction (see FIG. 6 and FIG. 7). As for respective shapes of the light-blocking portion 511*a* and the light-blocking portion 512*a*, a detailed description thereof will be given later.

The main body 51*a* has a recess 51*c* recessed downward from an upper surface thereof, and the linear member 54 is fitted in the recess 51*c*. Furthermore, the recess 51*c* includes a protrusion 51*d* protruding inwardly from an inner lateral surface thereof. The protrusion 51*d* is provided so as to bend the linear member 54 within the recess 51*c*. Thus, the cleaning holders 511 and 512 are firmly secured to the linear member 54. The recess 51*c* may be formed as a recess recessed upward from the lower surface of the main body 51*a*.

The linear member 54 is formed of, for example, a timing belt or a wire. On the casing 12*a*, the linear member 54 is stretched circularly among four stretching pulleys 57 by passing between every adjacent two of the transmissive members 52. Between every adjacent two of the transmissive members 52, the linear member 54 extends parallel to the extending direction of the transmissive members 52 (the X direction). The four stretching pulleys 57 are turnably retained on the upper surface of the cover portion 12*c*.

Furthermore, one of the stretching pulleys 57 is connected to a gear 57*a* arranged on a lower surface of the cover portion 12*c* (see FIG. 6 and FIG. 7). The gear 57*a* is connected to the motor 55. The motor 55 drives the gear 57*a* to turn so that the linear member 54 travels circularly.

The motor (the drive portion) 55 is arranged outward of the linear member 54 and is secured to the lower surface of the cover portion 12*c*. That is, an upper end of the motor 55 is arranged below an upper end of the linear member 54. This can achieve space saving on the upper surface of the cover portion 12*c*. Furthermore, since the motor 55 is arranged outward of the linear member 54, workability in maintenance of the motor 55 and the gear 57*a* is improved. The motor 55 is forwardly and reversely rotatable and drives the linear member 54 to travel circularly clockwise (in a D2 direction) or counterclockwise (in a D1 direction) in a top view (see FIG. 6 and FIG. 7). Thus, the cleaning holders 511 and 512 reciprocate along the longitudinal direction of the transmissive members 52 (a main scanning direction of laser light). Furthermore, during this reciprocation, the cleaning holder 511 and the cleaning holder 512 move linearly in mutually opposite directions.

A cleaning process is executed in response to an instruction to start the process inputted by a user via a host device such as an operation section 80 (see FIG. 10) or a personal computer when the image forming apparatus 1 is in a maintenance mode. Furthermore, the cleaning process may be executed periodically, for example, every time printing (image formation) of about 10,000 sheets is implemented.

The detecting portion 56 is arranged at the one side (the X1 side) in the extending direction of the transmissive members 52 and between a movement path of the cleaning holder 511 and a movement path of the cleaning holder 512 in the juxtaposition direction of the transmissive members 52 (the Y direction) (see FIG. 6 and FIG. 7). The detecting portion 56 detects that one of the cleaning holders 511 and 512 has reached one end of the movement path of the one of the cleaning holders 511 and 512. The one of the cleaning holders 511 and 512 that has reached the one end of the movement path thereof makes contact with the stopper 62, and thus movement thereof toward the one side (the X1 side) in the extending direction is restricted.

The detecting portion 56 is a sensor including a light emitter 56*a* and a light receiver 56*b*, and by the single sensor, it can be detected that either one of the cleaning holder 511 and the cleaning holder 512 has reached the one end of the movement path thereof. The light emitter 56*a* emits light in the juxtaposition direction of the transmissive members 52 (the Y direction). The light receiver 56*b* receives the light emitted from the light emitter 56*a*. While in this embodiment, the light emitter 56*a* is arranged closer to one side (the Y1 side) in the juxtaposition direction than the light receiver 56*b*, the light emitter 56*a* may be arranged closer to the other side (the Y2 side) in the juxtaposition direction than the light receiver 56*b*.

Figure 8:
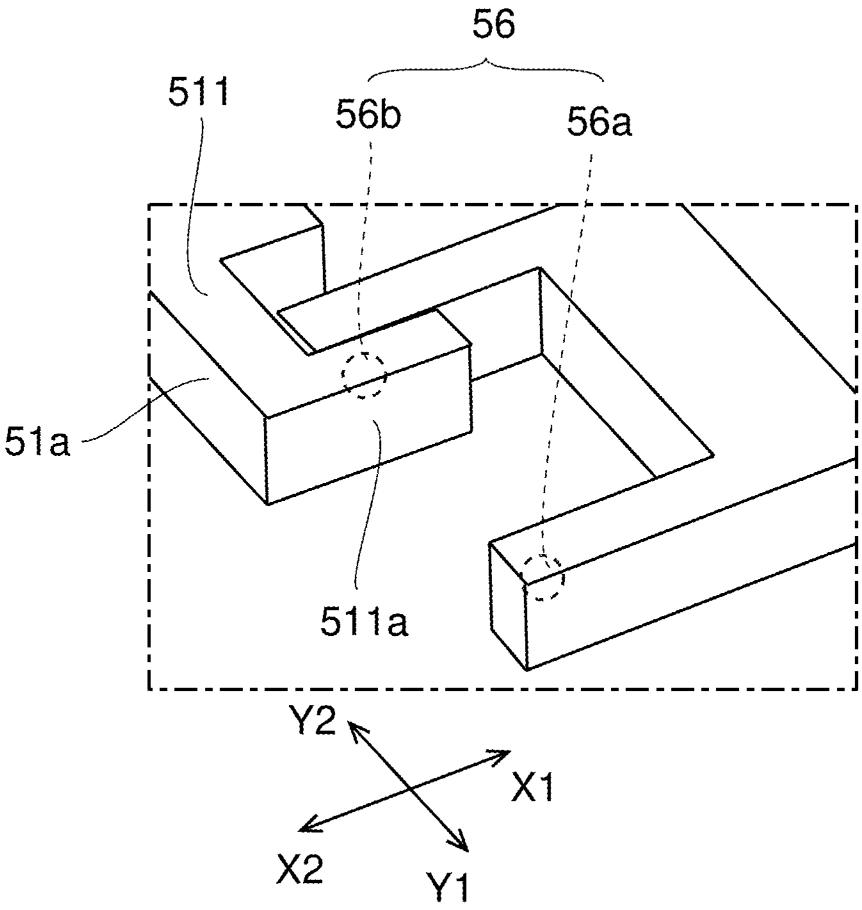
FIG. 8 A perspective view schematically showing a part of the optical scanning device 12 according to the embodiment of the present invention.
Figure 9:
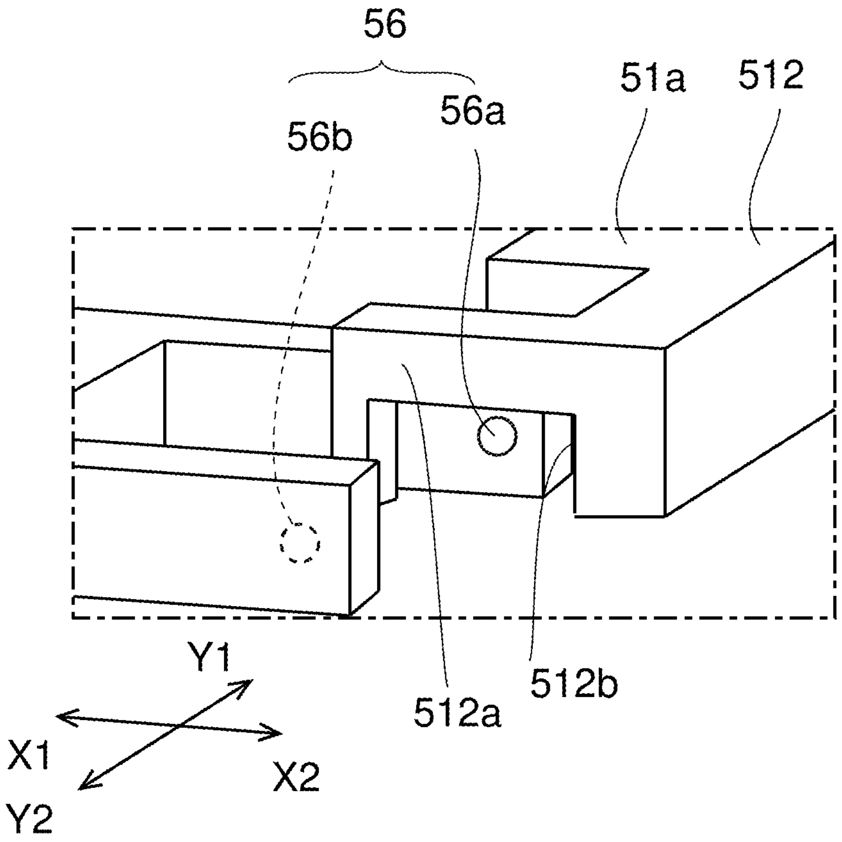
FIG. 9 A perspective view schematically showing a part of the optical scanning device 12 according to the embodiment of the present invention.

Next, with reference to FIG. 8 and FIG. 9, a description is given of the detecting portion 56 and the light-blocking portions 511*a* and 512*a*. FIG. 8 and FIG. 9 are each a perspective view schematically showing the detecting portion 56 and the light-blocking portions 511*a* and 512*a*, where FIG. 8 illustrates a relationship between the detecting portion 56 and the light-blocking portion 511*a* while FIG. 9 illustrates a relationship between the detecting portion 56 and the light-blocking portion 512*a*.

The light-blocking portion 511*a* and the light-blocking portion 512*a* are different in shape from each other. In this embodiment, while the light-blocking portion 512*a* has a through hole 512*b* formed to penetrate therethrough in the juxtaposition direction (the Y direction) (see FIG. 9), the light-blocking portion 511*a* has no through hole 512*b* formed therein (see FIG. 8).

Thus, when the cleaning holder 511 or the cleaning holder 512 reaches the one end of the movement path thereof, the light-blocking portion 511*a* and the light-blocking portion 512*a* have different patterns of light received by the light receiver 56*b*.

Specifically, when a distal end of the light-blocking portion 511*a* moving toward the one side (the X1 side) in the extending direction is inserted between the light emitter 56*a* and the light receiver 56*b*, light emitted from the light emitter 56*a* is blocked by the distal end of the light-blocking portion 511*a*. Thus, the light receiver 56*b* can no longer receive the light emitted from the light emitter 56*a*. At this time, the detecting portion 56 turns to an ON state. When the light-blocking portion 511*a* is moved further toward the one side (the X1 side) in the extending direction, the cleaning holder 511 reaches the one end of the movement path thereof and makes contact with the stopper 62. This restricts movement of the cleaning holder 511 toward the one side (the X1 side) in the extending direction. At this time, light emitted from the light emitter 56*a* is blocked by the light-blocking portion 511*a*, and thus the detecting portion 56 is maintained in the ON state (see FIG. 8).

On the other hand, when a distal end of the light-blocking portion 512*a* moving toward the one side (the X1 side) in the extending direction is inserted between the light emitter 56*a* and the light receiver 56*b*, light emitted from the light emitter 56*a* is blocked by the distal end of the light-blocking portion 512*a*. Thus, the light receiver 56*b* can no longer receive the light emitted from the light emitter 56*a*. At this time, the detecting portion 56 turns to the ON state. When the light-blocking portion 512*a* is moved further toward the one side (the X1 side) in the extending direction, the cleaning holder 512 reaches the one end of the movement path thereof and makes contact with the stopper 62. This restricts movement of the cleaning holder 512 toward the one side (the X1 side) in the extending direction. At this time, light emitted from the light emitter 56*a* passes through the through hole 512*b* to be received by the light receiver 56*b*, and thus the detecting portion 56 switches to an OFF state (see FIG. 9).

Thus, in a case where, during execution of a cleaning mode, the ON state is maintained for a prescribed length of time, the detecting portion 56 can detect that the cleaning holder 511 has reached the one end of the movement path of the cleaning holder 511. Furthermore, in a case where, during execution of the cleaning mode, the ON state is maintained for a prescribed length of time and then is switched to the OFF state, the detecting portion 56 can detect that the cleaning holder 512 has reached the one end of the movement path of the cleaning holder 512. At this time, the linear member 54 is stopped from traveling. That is, when one of the cleaning holders 511 and 512 has reached the one end of the movement path thereof, and thus movement thereof is restricted by the stopper 62, the other of the cleaning holders 511 and 512 is stopped from movement. Thus, on the other side (the X2 side) of the guide rails 61 in the extending direction thereof, where the guide rails 61 are open, the other of the cleaning holders 511 and 512 can be prevented from being disengaged from corresponding ones of the guide rails 61.

Next, referring back to FIG. 6 and FIG. 7, a description is given of an operation of the cleaning holders 511 and 512. In this embodiment, as described earlier, in one cleaning process, along the extending direction of the transmissive members 52 (the X direction), the cleaning members 53 corresponding thereto reciprocate once. Described herein is a case where, during the cleaning process, a traveling direction of the linear member 54 changes from a direction indicated by an arrow D1 (a first direction) to a direction indicated by an arrow D2 (a second direction).

At a start of the cleaning process, the cleaning holder 511, at the one end of the movement path thereof, has held the detecting portion 56 in the ON state (see FIG. 6). At a start of execution of the cleaning mode, a state where the cleaning holder 511 is arranged at the one end of the movement path thereof is set as an initial position, and thus the detecting portion 56 in the ON state can detect the cleaning holder 511. This can prevent an initial error in the cleaning process from occurring.

Upon a start of the cleaning process, the linear member 54 travels in the first direction indicated by the arrow D1 (see FIG. 6). Thus, the cleaning holder 511 and the cleaning holder 512 move from their respective positions shown in FIG. 6 to their respective positions shown in FIG. 7, and the detecting portion 56 detects that the cleaning holder 512 has reached the one end of the movement path thereof and then stops the linear member 54 from travelling. This stops movement of the cleaning holder 511 and the cleaning holder 512.

Next, a rotation direction of the motor 55 is reversed, and thus the linear member 54 travels in the second direction (a direction reverse to the first direction) indicated by the arrow D2 (see FIG. 7). Thus, the cleaning holder 511 and the cleaning holder 512 move from their respective positions shown in FIG. 7 to their respective positions shown in FIG. 6, and the detecting portion 56 detects that the cleaning holder 511 has reached the one end of the movement path thereof and then stops the linear member 54 from traveling. This stops an operation of the cleaning holder 511 and the cleaning holder 512. As for execution of the cleaning mode, a detailed description thereof will be given later.

FIG. 10 is a block diagram showing an example of control paths used in the image forming apparatus 1. In using the image forming apparatus 1, various portions thereof are controlled in different ways across complicated control paths all over the image forming apparatus 1. The following description, therefore, focuses on those control paths which are necessary for implementing the present invention.

A voltage control circuit 71 is connected to a motor drive power supply 73 and operates the motor drive power supply 73 based on an output signal from the control section 90. Based on a control signal from the voltage control circuit 71, the motor drive power supply 73 applies a prescribed drive voltage to the motor 55 in the optical scanning device 12.

In the operation section 80, a liquid crystal display portion 81 and LEDs 82 that indicate various types of states are provided to indicate a status of the image forming apparatus 1 and to display an image forming situation and the number of copies printed. Various settings for the image forming apparatus 1 are made via a printer driver of a personal computer.

The control section 90 includes at least a CPU (central processing unit) 91 as a central arithmetic processor, a ROM (read-only memory) 92 that is a read-only storage portion, a RAM (random-access memory) 93 that is a readable/writable storage portion, a timer 95, and an I/F (interface) 96 that transmits a control signal to various devices in the image forming apparatus 1 and receives an input signal from the operation section 80.

The ROM 92 contains, for example, data that would not be changed during use of the image forming apparatus 1, such as control programs for the image forming apparatus 1 and numerical values necessary for control. The RAM 93 stores, for example, necessary data generated while control of the image forming apparatus 1 is in progress and data temporarily required for controlling the image forming apparatus 1. Furthermore, the RAM 93 (or the ROM 92) also stores, for example, a voltage value (a duty) applied to the motor 55 in each of after-mentioned operation modes of the cleaning holders 51 and a driving time of the motor 55 during cleaning of the transmissive members 52 in the optical scanning device 12. The timer 95 measures the driving time of the motor 55.

Figure 11:
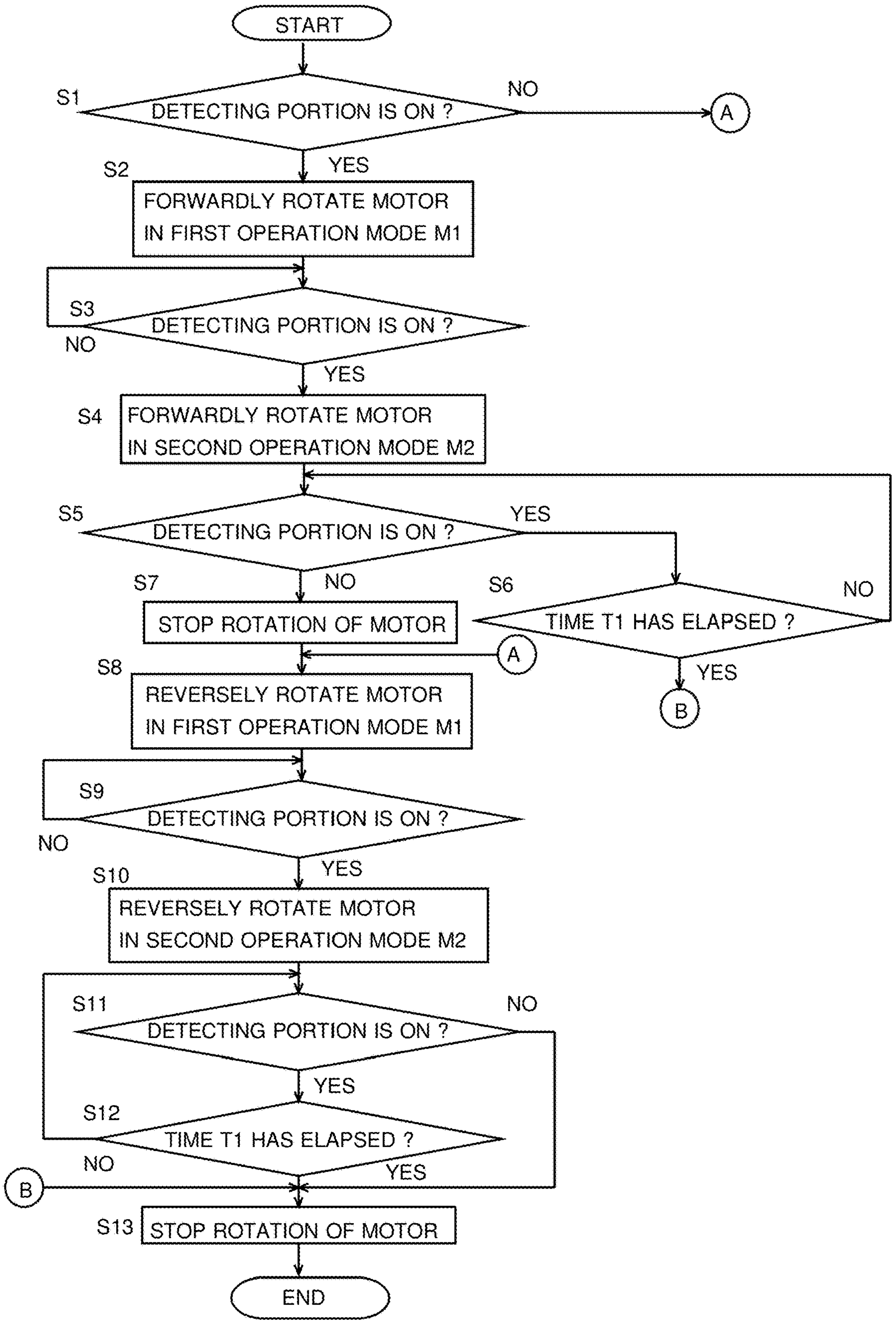
FIG. 11 A flow chart showing a first control example of control for driving a winding motor 55 in a cleaning mode.

FIG. 11 is a flow chart showing an example of control for driving the motor 55 in the cleaning mode. By referring to FIG. 1 to FIG. 10 as required, a description is given of a first control example of the motor 55 in accordance with steps shown in FIG. 11.

Upon a start of the cleaning mode, the control section 90 determines whether or not the detecting portion 56 is in the ON state (step S1). In a case where the detecting portion 56 is in the ON state (Yes at step S1), as shown in FIG. 6, the cleaning holder 511 is arranged at the one end of the movement path thereof, i.e., the initial position, and the light-blocking portion 511*a* is inserted between the light emitter 56*a* and the light receiver 56*b* so as to block light emitted from the light emitter 56*a*. Thus, in the case where the detecting portion 56 is in the ON state at step S1, the control section 90 determines that the cleaning holder 511 is at the initial position and then makes a transition to step S2.

On the other hand, in a case where the detecting portion 56 is in the OFF state (No at step S1), the control section 90 determines that the cleaning holder 512 is arranged at the one end of the movement path thereof and then makes a transition to step S8. At step S8, a homeward operation is started.

That is, at a start of execution of the cleaning mode, the control section 90 determines, by means of the detecting portion 56, which of the cleaning holder 511 and the cleaning holder 512 is arranged at the one end of the movement path thereof and, based on a result of the determination, determines which of an outward operation and the homeward operation is to be started. Thus, whichever of the cleaning holder 511 and the cleaning holder 512 has been arranged at the one end of the movement path thereof since an end of previous execution of the cleaning mode, it is possible to swiftly start up a cleaning operation.

At step S2, the control section 90 controls the motor 55 to continue forward rotation in a first operation mode M1. The control section 90 transmits a control signal to the voltage control circuit 71 so that a drive voltage is supplied from the motor drive power supply 73 to the motor 55. This causes the motor 55 to forwardly rotate in the first operation mode M1 (an initial operation mode).

As the motor 55 forwardly rotates, the linear member 54 travels in the arrow D1 direction from a state shown in FIG. 6, and thus the cleaning holder 511 starts moving downward in FIG. 6, while the cleaning holder 512 starts moving upward in FIG. 6.

At step S3, the control section 90 stays on standby until the detecting portion 56 turns to the ON state. When the cleaning holder 511 moves downward in FIG. 6 from the initial position, the light-blocking portion 511*a* moves away from between the light emitter 56*a* and the light receiver 56*b*, and thus the detecting portion 56 turns to the OFF state. In a case where the detecting portion 56 is in the OFF state (No at step S3), the motor 55 continues to forwardly rotate in the first operation mode M1.

On the other hand, in a case where the cleaning holder 512 has approached the one end of the movement path thereof (see FIG. 7), the distal end of the light-blocking portion 512*a* is inserted between the light emitter 56*a* and the light receiver 56*b*, and thus the detecting portion 56 turns to the ON state. At this time, a transition is made to step S4.

At step S4, the control section 90 controls the motor 55 to start forward rotation in a second operation mode M2. A rotation speed of the motor 55 in the second operation mode M2 is lower than that of the motor 55 in the first operation mode M1. At step S4, the light-blocking portion 512*a* is inserted further between the light emitter 56*a* and the light receiver 56*b*. At this time, by setting the rotation speed of the motor 55 in the second operation mode M2 to be lower than that of the motor 55 in the first operation mode M1, the detecting portion 56 can accurately detect movement of the light-blocking portion 512*a*.

At step S5, it is determined whether or not the detecting portion 56 is in the ON state. When the light-blocking portion 512*a* is inserted further between the light emitter 56*a* and the light receiver 56*b*, the through hole 512*b* is inserted between the light emitter 56*a* and the light receiver 56*b*, and thus light emitted from the light emitter 56*a* passes through the through hole 512*b*. The light receiver 56*b*, therefore, receives the light from the light emitter 56*a*, and thus the detecting portion 56 turns to the OFF state. At this time, the control section 90 determines that the cleaning holder 512 is arranged at the one end of the movement path thereof and then makes a transition to step S7.

At step S7, the control section 90 transmits a control signal to the voltage control circuit 71 so as to stop the forward rotation of the motor 55. The foregoing operations at steps S1 to S7 constitute the outward operation by the cleaning holder 511 and the cleaning holder 512.

On the other hand, in a case where the detecting portion 56 is in the ON state at step S5, a transition is made to step S6 at which it is determined whether or not a time T1 has elapsed. In a case where the time T1 has not elapsed yet, the operations at step S5 and step S6 are repeatedly performed so that the motor 55 continues to be driven in the second operation mode M2 until a lapse of the time T1. At this time, the light-blocking portion 512*a* is inserted further between the light emitter 56*a* and the light receiver 56*b*.

In a case where the detecting portion 56 is in the ON state even after the lapse of the time T1, the control section 90 determines that an error has occurred in movement of the cleaning holder 511 or the cleaning holder 512 and then makes a transition to step S13. At step S13, driving of the motor 55 is stopped so that the cleaning mode is ended. At this time, an error message is displayed on the liquid crystal display portion 81.

Next, the control section 90 transmits a control signal to the voltage control circuit 71 so that a drive voltage is supplied from the motor drive power supply 73 to the motor 55. This causes the motor 55 to reversely rotate in the first operation mode M1 (step S8).

As the motor 55 reversely rotates, the linear member 54 travels in the arrow D2 direction from a state shown in FIG. 7, and thus the cleaning holder 511 starts moving upward in FIG. 7, while the cleaning holder 512 starts moving downward in FIG. 7.

At step S9, the control section 90 stays on standby until the detecting portion 56 turns to the ON state. When the cleaning holder 512 moves downward in FIG. 7, the light-blocking portion 512*a* moves away from between the light emitter 56*a* and the light receiver 56*b*, and thus the detecting portion 56 stays in the OFF state. In a case where the detecting portion 56 is in the OFF state (No at step S9), the motor 55 continues to reversely rotate in the first operation mode M1.

On the other hand, in a case where the cleaning holder 511 has approached the one end of the movement path thereof (see FIG. 6), the distal end of the light-blocking portion 511*a* is inserted between the light emitter 56*a* and the light receiver 56*b*, and thus the detecting portion 56 turns to the ON state. At this time, a transition is made to step S10.

At step S10, the control section 90 controls the motor 55 to start reverse rotation in the second operation mode M2. The rotation speed of the motor 55 in the second operation mode M2 is lower than that of the motor 55 in the first operation mode M1. At this time, by setting the rotation speed of the motor 55 in the second operation mode M2 to be lower than that of the motor 55 in the first operation mode M1, the detecting portion 56 can accurately detect movement of the light-blocking portion 511*a*.

At step S11, it is determined whether or not the detecting portion 56 is in the ON state. Even in a case where the light-blocking portion 511*a* is inserted further between the light emitter 56*a* and the light receiver 56*b*, since the light-blocking portion 511*a* has no through hole 512*b* formed therein, the detecting portion 56 is maintained in the ON state.

In a case where the detecting portion 56 is in the ON state at step S11, a transition is made to step S12 at which it is determined whether or not the time T1 has elapsed. In a case where the time T1 has not elapsed yet, the operations at step S11 and step S12 are repeatedly performed so that the motor 55 continues to be driven in the second operation mode M2 until a lapse of the time T1.

In a case where the detecting portion 56 is in the ON state even after the lapse of the time T1, the control section 90 determines that the cleaning holder 511 has reached the one end of the movement path thereof and then makes a transition to step S13. At step S13, driving of the motor 55 is stopped so that the cleaning mode is ended.

On the other hand, in a case where the detecting portion 56 turns to the OFF state before the lapse of the time T1, it is determined that an error has occurred in movement of one of the cleaning holder 511 and the cleaning holder 512, and then a transition is made to step S13. At step S13, driving of the motor 55 is stopped so that the cleaning mode is ended. At this time, an error message is displayed on the liquid crystal display portion 81.

The foregoing operations at steps S8 to S13 constitute the homeward operation by the cleaning holder 511 and the cleaning holder 512.

According to this embodiment, during execution of the cleaning mode, upon detection by the detecting portion 56 that one of the cleaning holders 511 and 512 has reached the one end of the movement path thereof, the outward operation is started (steps S1 to S7), and upon detection by the detecting portion 56 that the other of the cleaning holder 511 the cleaning holders 511 and 512 has reached the one end of the movement path thereof, the homeward operation is started (steps S8 to S13). Thus, based on a result of the detection by the detecting portion 56, the control section 90 determines whether switching to the homeward operation or switching to the outward operation is to be performed, so that it is possible to reduce a load applied to the linear member 54 and thus to prevent damage to the stretching pulleys 57.

Furthermore, the light-blocking portion 511*a* and the light-blocking portion 512*a* are different in shape from each other, and the light-blocking portion 512*a* has the through hole 512*b*. Thus, based on a pattern of light received by the light receiver 56*b*, the detecting portion 56 can detect which of the cleaning holder 511 and the cleaning holder 512 has reached the one end of the movement path thereof. Accordingly, it is possible to simplify a configuration of the detecting portion 56 and thus to reduce a manufacturing cost of the optical scanning device 12.

Furthermore, the light-blocking portion 512*a* has the through hole 512*b* formed therein, and thus, based on a pattern of light received by the light receiver 56*b*, it can be easily detected which of the cleaning holder 511 and the cleaning holder 512 has reached the one end of the movement path thereof.

Furthermore, at a start of execution of the cleaning mode, a state where the cleaning holder 511 is arranged at the one end of the movement path thereof is set as the initial position, and thus the detecting portion 56 in the ON state can detect the cleaning holder 511. This can prevent an initial error in the cleaning process from occurring.

Furthermore, at a start of execution of the cleaning mode, the control section 90 determines, by means of the detecting portion 56, which of the cleaning holder 511 and the cleaning holder 512 is arranged at the one end of the movement path thereof and, based thereon, determines which of the outward operation and the homeward operation is to be started. Thus, whichever of the cleaning holder 511 and the cleaning holder 512 has been arranged at the one end of the movement path thereof since an end of previous execution of the cleaning mode, it is possible to swiftly start up the cleaning operation.

In addition, the present invention is not limited to the foregoing embodiment and can be variously modified without departing from the spirit of the present invention. For example, while the foregoing embodiment has exemplarily described a tandem color printer as the image forming apparatus 1, the present invention is not limited to color printers and is applicable also to color image forming apparatuses employing the electrophotographic method, such as a color copy machine, a facsimile, and so on.

INDUSTRIAL APPLICABILITY

The present invention is usable in an optical scanning device that irradiates an image carrier with light so as to form an electrostatic latent image thereon. Through the use of the present invention, it is possible to provide an optical scanning device capable of suppressing stretch or rupture of a linear member caused by a load continuously applied thereto when a cleaning holder cleaning a transmissive member, which transmits laser light therethrough, is stopped from movement, and an image forming apparatus including the same.

The invention claimed is:

1. An optical scanning device that irradiates an image carrier with laser light so as to form an electrostatic latent image thereon, the optical scanning device comprising:

a casing having a plurality of emission ports for emitting the laser light formed therein to extend in a main scanning direction of the laser light so as to each correspond to the image carrier;

a transmissive member that is transmissive to the laser light, extends in the main scanning direction of the laser light, and seals each of the plurality of emission ports for emitting the laser light;

a linear member that is stretched circularly on the casing;

a drive portion that drives the linear member to travel in a first direction and in a second direction;

guide rails that are provided side by side with the plurality of emission ports and extend in an extending direction of the transmissive member;

a pair of cleaning holders that is secured to the linear member and, when the linear member is driven to travel circularly by the drive portion, moves on the transmissive members adjacent to each other along the guide rails in mutually opposite directions;

a cleaning member that is secured to each of the pair of cleaning holders and, as the pair of cleaning holders moves, slides against the transmissive member, thus cleaning the transmissive member;

a detecting portion that is arranged at one side in the extending direction of the transmissive member and detects that the pair of cleaning holders has reached one ends of movement paths of the pair of cleaning holders; and a control section that controls driving of the drive portion, wherein the control section is capable of executing a cleaning mode including:

an outward operation in which the linear member is driven to travel in the first direction so that the pair of cleaning holders moves along the extending direction of the transmissive member; and a homeward operation in which, after execution of the outward operation, the linear member is driven to travel in the second direction so that the pair of cleaning holders moves in directions reverse to those in the outward operation, during execution of the cleaning mode, upon detection by the detecting portion that one of the pair of cleaning holders has reached the one end of the movement path of the one of the pair of cleaning holders, the outward operation is started, and upon detection by the detecting portion that another of the pair of cleaning holders has reached the one end of the movement path of the other of the pair of cleaning holders, the homeward operation is started, the detecting portion includes:

a light emitter that emits light in a juxtaposition direction of the transmissive member; and a light receiver that receives light emitted from the light emitter, each of the pair of cleaning holders includes a light-blocking portion that, when the each of the pair of cleaning holders reaches the one end of the movement path thereof, is inserted between the light emitter and the light receiver so as to block light emitted from the light emitter the pair of cleaning holders are different in shape of the light-blocking portion from each other, in the other of the pair of cleaning holders, a through hole is formed to penetrate through the light-blocking portion so that light emitted from the light emitter passes therethrough, during execution of the cleaning mode, when the other of the pair of cleaning holders has reached the one end of the movement path thereof, in the detecting portion, light emitted from the light emitter and having passed through the through hole is received by the light receiver, and when the one of the pair of cleaning holders has reached the one end of the movement path thereof, in the detecting portion, light emitted from the light emitter is blocked by the light-blocking portion of the one of the pair of cleaning holders.

2. The optical scanning device according to claim 1, wherein at a start of execution of the cleaning mode, the one of the pair of cleaning holders is arranged at the one end of the movement path of the one of the pair of cleaning holders.

3. The optical scanning device according to claim 1, wherein at a start of execution of the cleaning mode, the control section determines, by means of the detecting portion, which of the one and the other of the pair of cleaning holders is arranged at the one end of the movement path of the one or the other of the pair of cleaning holders and, based on a result of the determination, determines which of the outward operation and the homeward operation is to be started.

4. An image forming apparatus, comprising:

one or more image carriers each being identical to the image carrier; and the optical scanning device according to claim 1, which irradiates the one or more image carriers with laser light so as to form electrostatic latent images thereon.

5. An optical scanning device that irradiates an image carrier with laser light so as to form an electrostatic latent image thereon, the optical scanning device comprising:

a casing having a plurality of emission ports for emitting the laser light formed therein to extend in a main scanning direction of the laser light so as to each correspond to the image carrier;

a transmissive member that is transmissive to the laser light, extends in the main scanning direction of the laser light, and seals each of the plurality of emission ports;

a pair of cleaning holders that moves on the transmissive members in mutually opposite directions;

a cleaning member that is secured to each of the pair of cleaning holders and, as the pair of cleaning holders moves, slides against the transmissive member, thus cleaning the transmissive member;

a drive portion that drives the pair of cleaning holders to move in a first direction and in a second direction;

a single detecting portion that is arranged at one side in an extending direction of the transmissive member and detects that either one of the pair of cleaning holders has reached one end of a movement path of the either one of the pair of cleaning holders; and a control section that controls the drive portion, wherein the detecting portion includes:

a light emitter that emits light; and a light receiver that receives light emitted from the light emitter, each of the pair of cleaning holders includes a light-blocking portion that, when the each of the pair of cleaning holders reaches the one end of the movement path thereof, is inserted between the light emitter and the light receiver so as to block light emitted from the light emitter, the pair of cleaning holders are different in shape of the light-blocking portion from each other so as to have different patterns of light received by the light receiver, and based on a result of the detection by the detecting portion, the control section determines whether one or another of the pair of cleaning holders has reached the one end of the movement path thereof, and based on a result of the determination, the control section controls the drive portion so that a movement direction of the pair of cleaning holders is switched from the first direction to the second direction and vice versa.

6. The optical scanning device according to claim 5, further comprising:

a linear member that is stretched circularly on the casing, wherein the pair of cleaning holders is secured to the linear member, and the drive portion drives the linear member to travel in the first direction and in the second direction, thus driving the pair of cleaning holders to move.

7. The optical scanning device according to claim 5, wherein when the other of the pair of cleaning holders reaches the one end of the movement path thereof, the detecting portion switches to a state where light emitted from the light emitter is blocked by the light-blocking portion of the other of the pair of cleaning holders and then is received by the light receiver, and when the one of the pair of cleaning holders reaches the one end of the movement path thereof, the detecting portion is maintained in a state where light emitted from the light emitter is blocked by the light-blocking portion of the one of the pair of cleaning holders and is not received by the light receiver.

8. The optical scanning device according to claim 5, wherein in the other of the pair of cleaning holders, a through hole is formed to penetrate through the light-blocking portion so that light emitted from the light emitter passes therethrough, when the other of the pair of cleaning holders has reached the one end of the movement path thereof, in the detecting portion, light emitted from the light emitter and having passed through the through hole is received by the light receiver, and when the one of the pair of cleaning holders has reached the one end of the movement path thereof, in the detecting portion, light emitted from the light emitter is blocked by the light-blocking portion of the one of the pair of cleaning holders.

9. The optical scanning device according to claim 8, wherein at a start of execution of a cleaning mode in which the pair of cleaning holders is moved to clean the transmissive members, the one of the pair of cleaning holders is arranged at the one end of the movement path of the one of the pair of cleaning holders.

10. The optical scanning device according to claim 8, wherein at a start of execution of a cleaning mode in which the pair of cleaning holders is moved to clean the transmissive members, the control section determines, by means of the detecting portion, which of the one and the other of the pair of cleaning holders is arranged at the one end of the movement path of the one or the other of the pair of cleaning holders and, based on a result of the determination, determines whether the pair of cleaning holders is to be moved in the first direction or in the second direction.

11. An image forming apparatus, comprising:

one or more image carriers each being identical to the image carrier; and the optical scanning device according to claim 5, which irradiates the one or more image carriers with laser light so as to form electrostatic latent images thereon.

* * * * *